(12) United States Patent
Schmidt et al.

(10) Patent No.: US 8,536,449 B2
(45) Date of Patent: Sep. 17, 2013

(54) INSULATED WIRES FOR USE IN ELECTRONIC EQUIPMENT

(75) Inventors: Angelika Schmidt, Selfkant (DE); Christiaan Schröder, Geleen (NL)

(73) Assignee: DSM IP Assets B.V., Heerlen (NL)

( * ) Notice: Subject to any disclaimer, the term of this patent is extended or adjusted under 35 U.S.C. 154(b) by 710 days.

(21) Appl. No.: 12/305,422

(22) PCT Filed: Jun. 18, 2007

(86) PCT No.: PCT/EP2007/005345
§ 371 (c)(1),
(2), (4) Date: Nov. 2, 2009

(87) PCT Pub. No.: WO2008/011939
PCT Pub. Date: Jan. 31, 2008

(65) Prior Publication Data
US 2010/0044070 A1    Feb. 25, 2010

(30) Foreign Application Priority Data
Jul. 28, 2006  (EP) .................................. 06015752

(51) Int. Cl.
*H01B 7/00* (2006.01)
(52) U.S. Cl.
USPC ................... 174/36; 174/110 R; 174/110 SR
(58) Field of Classification Search
USPC ............... 174/110 R–110 PM, 113 R, 120 R, 174/120 AR
See application file for complete search history.

(56) References Cited

U.S. PATENT DOCUMENTS

| 5,015,681 | A | 5/1991 | Steiert et al. |
| 6,242,097 | B1 * | 6/2001 | Nishiguchi et al. ........... 428/383 |
| 8,076,581 | B2 * | 12/2011 | Schmidt .................. 174/110 SR |
| 2005/0143503 | A1 | 6/2005 | Bauer et al. |
| 2005/0250885 | A1 | 11/2005 | Mercx et al. |
| 2009/0176091 | A1 * | 7/2009 | Karayianni et al. .......... 428/375 |

FOREIGN PATENT DOCUMENTS

| EP | 1 544 206 | | 6/2005 |
| EP | 1544206 A1 | * | 6/2005 |
| JP | 2004-273121 | * | 9/2004 |
| WO | WO 2005/118698 | | 12/2005 |

OTHER PUBLICATIONS

Database WPI Week 200473, *Derwent Publications*, AN 2004-739564, XP002411452—& JP 2004-273121.
International Search Report for PCT/EP2007/005345 mailed Oct. 24, 2007.
Written Opinion for PCT/EP2007/005345 mailed Oct. 24, 2007.

* cited by examiner

*Primary Examiner* — William H Mayo, III
(74) *Attorney, Agent, or Firm* — Nixon & Vanderhye P.C.

(57) ABSTRACT

Insulated wires for use in electronic equipment have an electrically conductive core and an insulating layer and/or a insulating jacket formed of a flame retardant thermoplastic composition surrounding the electrically conductive core. The flame retardant thermoplastic composition includes (A) a thermoplastic copolyester elastomer and/or a copolyamide elastomer as a thermoplastic polymer component, (B) a metal salt of a phosphinic acid and/or a diphosphinic acid and/or a polymer thereof, (C) a nitrogen containing flame retardant synergist and/or a phosphor/nitrogen containing flame retardant as a flame retardant component, and (D) an inorganic compound chosen from basic and amphoteric oxides, hydroxides, carbonates, silicates, borates, stannates, mixed oxide-hydroxides, oxide-hydroxide-carbonates, hydroxide-silicates and hydroxide-borates, and mixtures thereof.

14 Claims, No Drawings

INSULATED WIRES FOR USE IN ELECTRONIC EQUIPMENT

This application is the U.S. national phase of International Application No. PCT/EP2007/005345 filed 18 Jun. 2007 which designated the U.S. and claims priority to European Patent Application No. 06015752.6 filed 28 Jul. 2006, the entire contents of each of which are hereby incorporated by reference.

The present invention relates to insulated wires for use in electronic equipment, comprising an electrically conductive core and an insulating layer surrounding the electrically conductive core.

More particularly, the present invention relates to insulated wires for electronic equipment having excellent mechanical characteristics, flexibility, humidity and heat resistance and flame retardancy.

Insulated wires, cables, and cords, which are used for inner and outer wiring of electric/electronic equipment and the like, are required to have various characteristics, including fire retardancy, heat resistance, and mechanical characteristics (e.g. tensile properties and abrasion resistance. The standards, for example, of the fire retardancy, the heat resistance, and the mechanical characteristics (e.g. tensile properties and abrasion resistance) required for wiring materials of electric/electronic equipment are stipulated in UL, JIS, etc. In particular, with respect to the fire retardancy, its test method varies depending on the required level (its use to be applied) and the like. Therefore, practically, it is enough for the material to have at least the fire retardancy according to the required level. For example, mention can be made the respective fire-retardancy to pass the vertical flame test (VW-1) stipulated in UL 1581 (Reference Standard for Electrical wires, Cables, and Flexible Cords), or the horizontal test and the inclined test stipulated in JIS C 3005 (rubber/plastic insulated wire test method). Further, wiring materials used in electric/electronic equipment are sometimes required to have a heat resistance of 80 to 105° C., or even 125° C., while in continuous use.

Conventionally, as the covering material used for these wiring materials, polyvinyl chloride (PVC) compounds comprising plasticizer, heavy metal stabilizer, and bromine atoms and/or chlorine atoms containing fire-retardant additives were used. These materials however posed environmental problems in that, when the wires are discarded or buried without being treated properly, the plasticizer and/or the heavy metal stabilizer is oozed out, or when they are burned, harmful gases are produced from the halogen.

As the PVC compounds became controversial, halogen free compounds comprising polyolefin copolymers and a halogen free flame retardant system comprising metal hydrate and optionally red phosphorous, were used as the wiring insulating material. Red phosphorous was used to enable reduction of the metal hydrate, since the metal hydrate, when used alone, had to be added in such high amounts that mechanical properties were jeopardized. However, flame retardant materials containing phosphorus pose other problems in that when the material is burned the phosphorus can produce toxic fumes whereas when the material is discarded the phosphorus can pollute the water environment by eutrophication. Furthermore, where wires and cables have to be coded with colour codes, red phosphorus cannot be used.

To comply with the heat resistance requirements, the covering material is crosslinked by an electron beam crosslinking method or a chemical crosslinking method, in order to render the wiring material highly heat resistant or an isolating material comprising a high melting point, such as a high melting polypropylene is used. Crosslinking however prevents melting of the insulating material and thus limits recyclability whereas the measures for crosslinking, either chemically by use of special additives or with special equipment, such as an electron beam crosslinking equipment, increases the cost of the electrical wire. On the other hand, where a resin such as a polypropylene, is used the flexibility is poor, and when the wiring material covered with such a resin is bent, a phenomenon occurs that whitens the surface.

Wiring for electronic equipment that is used in electronic equipments is required to satisfy requirements stipulated under a particularly severe vertical fire-retardancy standard (UL1581 VW-1) of UL Standard. However, even if a covering material is constituted with the above-described resin having a high melting point, such as a polypropylene resin, to which a metal hydrate is added in a large amount, it is difficult to largely improve the fire-retardancy of the covering material, and therefore, it does not satisfy the requirements stipulated under the vertical fire-retardancy standard that is a severe fire-retardancy standard.

A covering material of an electrical wire used for household electric appliances is also required to satisfy dynamic properties stipulated, e.g., under UL Standard, more specifically, required to have an elongation of 100% and a tensile strength of 10.3 MPa or more. In particular, a covering material of a power code is required to further have a good flexibility because power codes are shipped in the bundled state.

These problems are dealt with in U.S. Pat. No. 6,414,059 B1, which patent provides as a solution insulated wires wherein the insulating layer consists of a partially crosslinked thermoplastic fire-retardant resin composition, made of a composition comprising 100 parts by weight of a resin component comprising a blend of a block copolymer and an ethylene based copolymer, a small amount of a crosslink system consisting of an organic peroxide and a (meth)acrylate-series and/or allyl-series crosslinking aid, next to other optional components, and 50-300 pbw of a flame retardant system comprising a metal hydrate that is at least partially pre-treated with a silane coupling agent. The block copolymer is a block copolymer made up of at least two polymer blocks A mainly made of a vinyl aromatic compound as its constitutional component and at least one polymer block B mainly made of a conjugated diene compound as its constitutional component, and/or a hydrogenated block copolymer obtained by hydrogenating the block copolymer.

The composition of the insulating layer in the known insulated wires of U.S. Pat. No. 6,414,059 B1 generally comprises a very large amount of flame retardant, typically in the range of 100-250 pbw, relative to 100 parts by weight of the resin component, and needs special preparation for obtaining a good homogeneous blend and partially crosslinking while retaining thermoplastic properties. The large amounts of flame retardants complicates processing both during preparation, where it can effect both the homogeneous blending and the crosslinking, as well as during extrusion coating of the insulating layer on the electrically conductive core.

Another disadvantage of the large amount of flame retardants is that the mechanical properties of the insulating layer are affected in that the modulus is increased, which is a problem in case of applications, such as mobile phone charger cables, which require a high flexibility and low stiffness. Also crosslinking, when applied in substantial amount, can reduce the flexibility of the insulating layer.

Other flame retardant materials for insulating cable jackets comprising flame retardants in a lower total mount typically comprise red phosphorous in combination with one or more other flame retardants. For example, WO9220731 describes mixtures of red phosphorus and ammonium phosphate or amine phosphate, and WO200175907 describes mixtures of red phosphorus melamine, magnesium or aluminium hydroxide and zeolite. The use of red phosphorus is not without dispute, since it can produce toxic fumes, in addition to lending the compound a red coloration.

The aim of the invention is to provide insulated wires for use in electronic equipment comprising an electrically conductive core and an insulating layer surrounding the electrically conductive core consisting of a halogen free flame retardant thermoplastic composition, which comply with the vertical flame retardancy standard (UL1581 VW-1) of UL Standard, and which does not have the problems of the known composition or in lesser extent. Moreover, the insulated wires must have a good hydrolytical resistance.

This aim has been achieved with the insulated wires comprising a insulating layer and/or a jacket consisting of a flame retardant thermoplastic composition according to the invention, wherein the flame retardant thermoplastic composition comprises
(A) a thermoplastic polymer comprising a copolyester elastomer (TPE-E) and/or a copolyamide elastomer (TPE-A),
(B) a metal salt of a phosphinic acid and/or a diphosphinic acid, and/or a polymer thereof,
(C) a flame retardant component consisting of a nitrogen containing flame retardant synergist and/or a phosphor/nitrogen containing flame retardant, and
(D) an inorganic compound,
according to claim 1.

The effect of the insulating layer and/or a jacket in the insulated wire according to the invention consisting of the said flame retardant elastomeric thermoplastic composition is that the insulated wire has flame retardancy properties compliant with the UL 1581 VW-1 standard meanwhile showing very good mechanical properties in terms of low modulus and high flexibility. The said flame retardant thermoplastic composition can be easily processed and the insulated wires can be well produced and are easily recyclable. Moreover, the new insulated wires show good hydrolytical properties.

This effect of the flame retardant properties compliant with the UL 1581 VW-1 standard is already obtained when the components (B)-(D) are present in a relative low amount, i.e. at levels far below the minimum level needed for obtaining, for example, a UL-V-0 rating. This result is highly surprising in particular in view of the fact that in flame retardant thermoplastic compositions also comprising a TPE-E and/or TPE-A and further comprising other halogen free flame retardants, for example melamine cyanurate, the level of flame retardant can be adjusted to comply with a UL-V-0 rating, but which level is still not sufficient to comply with the UL 1581 VW-1 standard. The minimum level of melamine cyanurate to comply with UL-V-0, while still failing UL 1581 VW-1, is much higher than the level of the flame retardant system used in the flame retardant elastomeric thermoplastic composition in the insulated wire according to the invention needed to already comply with the UL 1581 VW-1 standard. A further advantage of the flame retardant elastomeric composition is that it has a very high degree of flexibility, exhibited by a low E-modulus. This low E-modulus may be attributable to the TPE-E and/or TPE-A in the flame retardant thermoplastic composition, but is also due to the surprising fact that the flexibility is well retained despite the fact of the presence of the flame retardant system. This in contrast to other flame retardant systems, such as melamine cyanurate, which when used in a same amount as the flame retardant system in the insulated wire according to the invention, detracts much more from the original flexural modulus of the TPE-E and/or TPE-A. This negative effect would have been further augmented to a detrimental level when the amount of melamine cyanurate would have to be raised to such a level where the composition would comply with UL-V-0, let alone UL 1581 VW-1 if possible anyway.

Flame retardant thermoplastic compositions which are claimed to be suitable for use as insulting layer or jacket in electrical cables are many, most of them have flame retarding properties complying with UL-V-2, UL-V-1 or UL-V-0 ratings; however compliance with UL 1581 VW-1 is generally not reported, if compliant at all.

Electrical cables comprising an insulating layer and/or a jacket consisting of a halogen free flame retardant thermoplastic composition comprising a TPE-E and/or TPE-A are known, for example, from EP-376237-A, WO-9220731-A1, EP-831120-A1, WO-200175907-A1. EP-376237-A describes compositions consisting of a major amount of polyamide, a minor amount of thermoplastic polyester elastomer, and melamine cyanurate as flame retardant, and optionally fibrous or particulate fillers. These compositions are certainly not flexible compositions. WO-9220731-A1 describes a composition comprising a polyetherester and a combination of red phosphorous and ammonium phosphate as flame retardants. The composition further comprises a triallylcyanurate, which is irradiated after moulding. The flame retardant thermoplastic composition in EP-831120-A1 comprises a thermoplastic polymer, among the many of which mentioned is polyether/polyester copolymer, but not explicitly a copolyetherester elastomer, and a flame retardant system comprising magnesium hydroxide, calcium carbonate, phosphorous compound(s) and nitrogen compound(s). For the flame retardant thermoplastic composition in WO-200175907-A1 a thermoplastic polymer, optionally being a polyether/polyester but preferably a polypropylene, is used. The flame retardant system in the said composition comprises melamine or a derivative thereof, red phosphorous, magnesium and/or aluminium hydroxide or hydrated oxide and a zeolite. Non of the cited patent applications mentions the performance of the electrical cables in the UL 1581 VW-1 nor a flame retardant system as comprised in the electrical cables according to the invention, let alone the effect thereof in the UL 1581 VW-1 test as obtained in the present invention.

Flame retardant thermoplastic composition comprising a salt of formula (I) and/or (II) and/or a polymer thereof and a nitrogen containing synergist and/or a phosphor/nitrogen containing flame retardant as well as such compositions further comprising a basic or amphoteric compound are also known, for example from EP454948-A1. In this patent application, as the thermoplastic polymer various polymers are mentioned including polyesters and polyamides, preferably polyamides. The examples in particular include glass fibre reinforced polyamides. EP454948-A1 neither discloses flexible compositions comprising a TPE-E and/or TPE-A nor electrical cables, let alone electrical cables comprising a TPE-E and/or TPE-A. EP-454948-A1 does not relate to electrical cables and does not describe test results according to the UL 1581 VW-1 standard, let alone the effect of the flame retardant in the elastomer composition and properties thereof in the electrical cables as according to the present invention.

The thermoplastic polymer (A) comprised by the flame retardant thermoplastic composition in the insulated wire according to the invention, comprises a copolyester elastomer (TPE-E) and/or a copolyamide elastomer (TPE-A). Copolyester elastomers and copolyamide elastomers are thermoplastic polymers with elastomeric properties comprising hard blocks consisting of respectively polyester segments or polyamide segments, and soft blocks consisting of segments of another polymer. Such polymers are also known as block-copolymers. The polyester segments in the hard blocks of the copolyester elastomers are generally composed of repeating units derived from at least one alkylene diol and at least one aromatic or cycloaliphatic dicarboxylic acid. The polyamide segments in the hard blocks of the copolyamide elastomers are generally composed of repeating units derived from at least one aromatic and/or aliphatic diamine and at least one aromatic or aliphatic dicarboxylic acid, and or an aliphatic amino-carboxylic acid.

The hard blocks typically consist of a polyester or polyamide having a melting temperature or glass temperature, where applicable, well above room temperature, and may be as high as 300° C. or even higher. Preferably the melting temperature or glass temperature is at least 150° C., more preferably at least 170° C. or even at least 190° C. Still more preferably the melting temperature or glass temperature of the hard blocks is in the range of 200-280° C., or even 220-250° C. The soft blocks typically consist of segments of an amorphous polymer having a glass transition temperature well below room temperature and which temperature may be as low as −70° C. or even lower. Preferably the glass temperature of the amorphous polymer is at most 0° C., more preferably at most −10° C. or even at most −20° C. Still more preferably the glass temperature of the soft blocks is in the range of −20--60° C., ort even −30--50° C.

Suitably, the copolyester elastomer is a copolyesterester elastomer, a copolycarbonateester elastomer, and/or a copolyetherester elastomer; i.e. a copolyester block copolymer with soft blocks consisting of segments of polyesters, polycarbonate or, respectively, polyether. Suitable copolyesterester elastomers are described, for example, in EP-01 02115-B1. Suitable copolycarbonateester elastomers are described, for example, in EP-0846712-B1. Copolyester elastomers are available, for example, under the trade name Arnitel, from DSM Engineering Plastics B.V. The Netherlands. Suitably, the copolyamide elastomer is a copolyetheramide elastomer. Copolyetheramide elastomers are available, for example, under the trade name PEBAX, from Elf Atochem, France.

Preferably, the block-copolymer elastomer in the flame retardant thermoplastic composition is a copolyester elastomer, more preferably a copolyetherester elastomer.

Copolyetherester elastomers have soft segments derived from at least one polyalkylene oxide glycol. Copolyetherester elastomers and the preparation and properties thereof are in the art and for example described in detail in Thermoplastic Elastomers, 2nd Ed., Chapter 8, Carl Hanser Verlag (1996) ISBN 1-56990-205-4, Handbook of Thermoplastics, Ed. O. Otabisi, Chapter 17, Marcel Dekker Inc., New York 1997, ISBN 0-8247-9797-3, and the Encyclopedia of Polymer Science and Engineering, Vol. 12, pp. 75-117 (1988), John Wiley and Sons, and the references mentioned therein.

The aromatic dicarboxylic acid in the hard blocks of the polyetherester elastomer suitably is selected from the group consisting of terephthalic acid, isophthalic acid, phthalic acid, 2,6-naphthalenedicarboxylic acid and 4,4-diphenyldicarboxylic acid, and mixtures thereof. Preferably, the aromatic dicarboxylic acid comprises terephthalic acid, more preferably consists for at least 50 mole %, still more preferably at least 90 mole %, or even fully consists of terephthalic acid, relative to the total molar amount of dicarboxylic acid.

The alkylene diol in the hard blocks of the polyetherester elastomer suitably is selected from the group consisting of ethylene glycol, propylene glycol, butylene glycol, 1,2-hexane diol, 1,6-hexamethylene diol, 1,4-butane diol, benzene dimethanol, cyclohexane diol, cyclohexane dimethanol, and mixtures thereof. Preferably, the alkylene diol comprises ethylene glycol and/or 1,4 butane diol, more preferably consists for at least 50 mole %, still more preferably at least 90 mole %, or even fully consists of ethylene glycol and/or 1,4 butane diol, relative to the total molar amount of alkylene diol.

The hard blocks of the polyetherester elastomer most preferably comprise or even consist of polybutylene terephthalate segments.

Suitably, the polyalkylene oxide glycol is a homopolymer or copolymer on the basis of oxiranes, oxetanes and/or oxolanes. Examples of suitable oxiranes, where upon the polyalkylene oxide glycol may be based, are ethylene oxide and propylene oxide. The corresponding polyalkylene oxide glycol homopolymers are known by the names polyethylene glycol, polyethylene oxide, or polyethylene oxide glycol (also abbreviated as PEG or pEO), and polypropylene glycol, polypropylene oxide or polypropylene oxide glycol (also abbreviated as PPG or pPO), respectively. An example of a suitable oxetane, where upon the polyalkylene oxide glycol may be based, is 1,3-propanediol. The corresponding polyalkylene oxide glycol homopolymer is known by the name of poly(trimethylene)glycol. An example of a suitable oxolane, where upon the polyalkylene oxide glycol may be based, is tetrahydrofuran. The corresponding polyalkylene oxide glycol homopolymer is known by the name of poly(tretramethylene)glycol (PTMG) or polytetrahydrofuran (PTHF). The polyalkylene oxide glycol copolymer can be random copolymers, block copolymers or mixed structures thereof. Suitable copolymers are, for example, ethylene oxide/polypropylene oxide block-copolymers, (or EO/PO block copolymer), in particular ethylene-oxide-terminated polypropylene oxide glycol.

The polyalkylene oxide can also be based on the etherification product of alkylene diols or mixtures of alkylene diols or low molecular weight poly alkylene oxide glycol or mixtures of the aforementioned glycols.

Preferably, the polyalkylene oxide glycol used in the flame retardant thermoplastic composition in the insulated wire according to the invention is selected from the group consisting of polypropylene oxide glycol homopolymers (PPG), ethylene oxide/polypropylene oxide block-copolymers (EO/PO block copolymer) and poly(tretramethylene)glycol (PTMG), and mixtures thereof.

The thermoplastic polymer (A) may comprise, next to the copolyester elastomer and/or copolyamide elastomer, one or more other thermoplastic polymers. Suitable other thermoplastic polymers are, for example, polyesters, polyamides and polycarbonates. The other thermoplastic polymers are suitably present in such an amount that the flame retardancy properties according to UL 1581 VW-1 are maintained and the mechanical properties are retained at a level corresponding with the requirements of the intended application of the insulated wires.

Preferably the thermoplastic polymer (A) comprised by the flame retardant thermoplastic composition consists for at least 50 wt. %, more preferably at least 70 wt. %, and still more preferably at least 90 wt. %, relative to the total weight of (A), of a total amount of the copolyester elastomer and/or copolyamide elastomer.

The component B in the flame retardant thermoplastic composition consists of metal salts of phosphinic acids and/or diphosphinic acids or polymeric derivatives thereof, which compounds are also denoted as metal phosphinates. This term will also be used further herein to indicate the same compounds.

Suitably, the metal phosphinate is a metal of a phosphinic acid of the formula $[R^1R^2P(O)O]^-{}_mM^{m+}$ (formula I) and/or a diphosphinic acid of the formula $[O(O)PR^1—R^3—PR^2(O)O]^{2-}{}_nM_x{}^{m+}$ (formula II), and/or a polymer thereof, wherein $R^1$ and $R^2$ are equal or different substituents chosen from the group consisting of hydrogen, linear, branched and cyclic C1-C6 aliphatic groups, and aromatic groups, $R^3$ is chosen from the group consisting of linear, branched and cyclic C1-C10 aliphatic groups and C6-C10 aromatic and aliphatic-aromatic groups, M is a metal chosen from the group consisting of Mg, Ca, Al, Sb, Sn, Ge, Ti, Zn, Fe, Zr, Ce, Bi, Sr, Mn, Li, Na, and K, and m, n and x are equal or different integers in the range of 1-4.

Suitable metal phosphinates that can be used as component B in the present invention are described for example in DE-A 2 252 258, DE-A 2 447 727, PCT/W-097/39053 and EP-0932643-B1. Preferred phosphinates are aluminium-, calcium- and zink-phosphinates, i.e. metal phosphinates wherein the metal M=Al, Ca, Zn respectively, and combinations thereof. Also preferred are metal phosphinates wherein $R^1$ and $R^2$ are the same or different and are equal to H, linear or branched $C_1$-$C_6$-alkyl groups, and/or phenyl. Particular preferably, $R^1$, $R^2$ are the same or different and are chosen from the group consisting of hydrogen (H), methyl, ethyl, n-propyl, iso-propyl, n-butyl, tert.-butyl, n-pentyl and phenyl. More preferably, $R^1$ and $R^2$ are the same or different and are chosen from the group of substituents consisting of H, methyl and ethyl.

Also preferably $R^3$ is chosen from the group consisting of methylene, ethylene, n-propylene, iso-propylene, n-butylene, tert.-butylene, n-pentylene, n-octylene, n-dodecylene, phenylene and naphthylene.

Highly preferably, the metal phosphinate comprises a hypophosphate and/or a $C_1$-$C_2$ dialkylphosphinate, more preferably Ca-hypophosphate and/or an Al—$C_1$-$C_2$ dialkylphosphinate, i.e. Al-dimethylphosphinate, Al-methylethylphosphinate and/or Al-diethylphosphinate.

The nitrogen containing and nitrogen/phosphor containing component C in the flame retardant elastomeric thermoplastic composition can be any nitrogen or nitrogen and phosphor containing compound that itself is a flame retardant and/or is a flame retardant synergist for phosphinate flame retardants. Suitable nitrogen containing and nitrogen/phosphor containing compounds that can be used as component (C) are described, for example in PCT/EP97/01664, DE-A-197 34 437, DE-A-197 37 72, and DE-A-196 14 424.

Preferably, the nitrogen containing synergist is chosen from the group consisting of benzoguanamine, tris(hydroxyethyl)isocyanurate, allantoine, glycouril, melamine, melamine cyanurate, dicyandiamide, guanidine and carbodiimide, and derivatives thereof.

More preferably, the nitrogen containing synergist comprises a condensations product of melamine. Condensations products of melamine are, for example, melem, melam and melon, as well as higher derivatives and mixtures thereof. Condensations products of melamine can be produced by a method as described, for example, in PCT/WO 96/16948.

Preferably, the nitrogen/phosphor containing flame retardant is a reaction product of melamine with phosphoric acid and/or a condensation product thereof. With the reaction product of melamine with phosphoric acid and/or a condensation product thereof are herein understood compounds, which result from the reaction of melamine or a condensation products of melamine are, for example, melem, melam and melon, with a phosphoric acid.

Examples include dimelaminephosphate, dimelamine pyrophosphate, melamine phosphate, melamine polyphosphate, melamine pyrophosphate, melamine polyphosphate, melam polyphosphate, melon polyphosphate and melem polyphosphate, as are described for example in PCT/WO 98/39306. More preferably the nitrogen/phosphor containing flame retardant is melamine polyphosphate.

Also preferably, the nitrogen/phosphor containing flame retardant is a reaction product of ammonia with phosphoric acid or a polyphosphate modification thereof. Suitable examples include ammonium hydrogenphosphate, ammonium dihydrogenphosphate and ammonium polyphosphate. More preferably the nitrogen/phosphor containing flame retardant comprises ammonium polyphosphate.

Preferably the flame retardant component (C) is a phosphate compound, more preferably a melamine phosphate compound, most preferably a melamine polyphosphate.

The flame retardant thermoplastic composition in the insulated wire according to the invention suitably comprises an inorganic compound D chosen from the group consisting of basic and amphoteric oxides, hydroxides, carbonates, silicates, borates, stannates, mixed oxide-hydroxides, oxide-hydroxide-carbonates, hydroxide-silicates and hydroxide-borates, and mixtures thereof.

Preferred metal oxides are magnesium oxide, calcium oxide, aluminium oxide, zink oxide, manganese oxide and stannum oxide.

Preferred hydroxides are aluminium hydroxide, bohmite, magnesium hydroxide, hydrotalcite, dihydrotalcite, hydrocalumite, calcium hydroxide, zink hydroxide, stannum oxidehydrate and manganese hydroxide.

Preferably, the inorganic compound D comprises, or even is, a compound chosen from the group consisting of zink borate, basic zink silicate and zink stannate, magnesium hydroxide, zink oxide, zinc sulphide, hydrotalcite, dihydrotalcite and bohmite, and mixtures thereof, more preferably zink borate, zink sulphide, zink oxide, magnesiumhydroxide, hydrotalcite and dihydrotalcite, and mixtures thereof.

Most preferably, the inorganic compound D comprises, or even is, zink borate.

In a preferred embodiment of the invention, the flame retardant thermoplastic composition comprises the components (B), (C) and (D) in a total amount of 10-50 wt. %, more preferably 15-40 wt. % and even 20-30 wt. %, relative to the total weight of the flame retardant thermoplastic composition. A higher minimal total amount for components (B), (C) and (D) has the advantage that even better flame retardancy properties are obtained. A lower maximum total amount for components (B), (C) and (D) has the advantage that the insulated wires have a better flexibility, which is in particular an advantage when the insulated wires have to comply with UL 1581 VW-1, which they already do, but don't have to comply with further flame retardancy standards.

More preferably, the components (B), (C) and (D) are present in an amount of respectively, 20-90 wt. %, or even 50-80 wt. % of compound B, 10-80 wt. % or even 20-50 wt. % of compound C, and 1-20 wt. %, or even 2-10 wt. % of compound D, relative to the total weight of the compounds (B), (C) and (D).

In a more preferred embodiment of the insulated wire according to the invention, the metal salt (B) and the flame retardant component (C) are present in a weight ratio in the range of 9:1-2:8, preferably 5:1-1:1.

In another more preferred embodiment, the inorganic compound (C) is present in an amount of 0.01-5 wt. %, preferably 0.1-2 wt. %, relative to the total weight of the thermoplastic composition.

In a special embodiment of the invention, the insulated layer and/or the insulating jacket consist of a flame retardant thermoplastic composition wherein:

- a copolyetherester elastomer is present in an amount of at least 50 wt. %, relative to the total weight of the thermoplastic polymer (A);
- the metal salt (B), the flame retardant component (C) and the inorganic compound (D) in a total amount of 10-50 wt. %, relative to the total weight of the thermoplastic composition;
- the metal salt (B) comprises Ca-hypophosphite and/or a Al—$C_1$-$C_2$ dialkylphosphinate;
- the flame retardant component (C) comprises a melamine phosphate compound;
- the aluminium salt and the melamine phosphate compound are present in a total amount of at least 50 wt. %, relative to the total weight of (B) and (C);
- the inorganic compound (D) comprises zinc borate in an amount of 0.01-5 wt. %, relative to the total weight of the thermoplastic composition.

The flame retardant thermoplastic composition in the insulated wires according to the invention may suitably comprise one or more additives. The additive or additives that can be used in the flame retardant thermoplastic composition may be any auxiliary additive, or combination of auxiliary additives, that is suitable for use in flame retardant thermoplastic compositions in general and in copolyester and copolyamide elastomers in particular.

Suitable additives include stabilizers, such as antioxidants, UV-absorbers and heat stabilizers, tougheners, impact modifiers, plasticizers, lubricants, emulsifiers, nucleating agents, fillers, pigments, optical brighteners, further flame retardants, and antistatic agents. Suitable fillers are, for example, calcium carbonate, silicates, talcum, and carbon black.

Preferably, the flame retardant thermoplastic composition comprises a stabilizer. Suitable compounds that can be used as stabilizer include phosphites and phosphonites, esters and salts of long chain fatty acids and dicarboxamide compounds.

In a preferred embodiment of the invention the flame retardant thermoplastic composition comprises one or more additives in a total amount of 0.01-20 wt. %, more preferably 0.1-10 wt. %, still more preferably 0.2-5 wt. %, or even 0.5-2 wt. % relative to the total weight of the flame retardant thermoplastic composition.

More preferably, the flame retardant thermoplastic composition comprises one or more compounds chosen from the group of phosphites and phosphonites, esters and salts of long chain fatty acids and dicarboxamide compounds, in a total amount of the one or more compounds of 0.01-3 wt. %, still more preferably 0.1-1.0 wt. %, relative to the total weight of the flame retardant thermoplastic composition.

The invention in particular relates to an insulated wire wherein the insulated wire is a bipolar or tripolar wire consisting of two or three electrically conductive cores, two or three insulating layers each surrounding one of the electrically conductive cores, and optionally a jacket layer surrounding the electrically conductive cores and the insulating layers, wherein the insulating layers and/or the jacket layer consist of the flame retardant thermoplastic polymer composition comprising components (B), (C) and (D) or any preferred embodiment thereof as described above.

The invention also relates to a connection cable comprising (i) a piece of an insulated wire according to the invention or any preferred embodiment thereof and (ii) one or two connection elements, for connecting the cable to electrical and/or electronic equipment and/or to a power supply unit, fixed to the piece of insulated wire and optionally (iii) a electrical or electronic part.

Suitably, the connection cable is a mobile phone charger cable or computer accessory connection cable.

The invention further relates to the use of the inventive insulated wires and connection cables made thereof in or connected to electronic equipment and to electronic equipment comprising insulated wires according to the invention, or any preferred embodiment thereof.

The invention also relates to a flame retardant thermoplastic composition. The flame retardant thermoplastic composition according to the invention corresponds with the flame retardant elastomeric thermoplastic composition in the insulated wire according to the invention described here above, and any of the preferred embodiments thereof. The advantage of the flame retardant thermoplastic composition according to the invention resides in the effects on flame retardancy according to UL 1581 VW-1 and other effects when the flame retardant thermoplastic composition is applied in electrical cables as described above.

The flame retardant thermoplastic composition can be made by compounding methods used in the art for making flame retardant thermoplastic compositions in general and elastomeric thermoplastic compositions in particular. Suitable methods include methods involving melt mixing, i.e. methods wherein the thermoplastic polymer (A) comprising or consisting of the copolyester and/or copolyamide elastomer is transformed into a melt and the components (B), (C), and (D) and other optional additives are added, simultaneously, consecutively or partly simultaneously and partly consecutively to the thermoplastic polymer (A) comprising or consisting of the copolyester and/or copolyamide elastomer prior, during or after the transformation into the melt and the polymer melt and the polymer melt and other components and additives are mixed to form a homogenous mixture.

Suitably, this melt mixing is performed in an extruder and the homogenous mixture after being formed by said melt mixing is discharged from the extruder after which the composition is cooled and optionally granulated.

It is also possible to add the flame retardant components and the additives in the form of a master batch. It is also possible, in particular with solid additives, to add the additive or additives after cooling and optional granulation, whereby the additive or additives is applied on the granule surface.

The cooled and optionally granulated composition can be used for making the insulated wires, for example by extrusion coating of one or more metal wires which than form the electrically conductive core of the resulting insulated wires.

The invention is further illustrated with the following Examples and Comparative Experiments.

Materials

| | |
|---|---|
| TPE-E-1: | Polyetherester comprising hard segments consisting of polybutyleneterephthalate segments and soft segments consisting of EO/PO polyether blockcopolymer with a shore-D hardness of 38. |
| TPE-E-2: | Polyesterester comprising hard segments consisting of polybutyleneterephthalate segments and soft segments consisting of polylactone segments linked with urethane groups with a shore-D hardness of 55. |
| Melamine cyanurate: | Melamine cyanurate (MC50; particle size distribution with a d50 of about 4.2 μm and a d99 of about 45 μm) |
| Compound B: | DEPAL: Aluminium diethylphosphinate; Clariant, Germany. |

-continued

| | |
|---|---|
| Compound C: | Melapur 200: Melamine polyphosphate; Ciba Geigy,Switzerland. |
| Compound D: | Zinc Borate (2ZnO$_3$B$_2$O$_3$·3.5H$_2$O), Firebrake ZB, Borax, USA |
| Adds: | Blend of auxiliary stabilizer package. |

Moulding compositions of Examples I-II (EX-I and EX-II) according to the invention and Comparative Experiments A-D (CE-A, CE-B, CE-C and CE-D) were prepared and tested as described below. The compositions and test results are presented in Table 1.

Compounding

For the preparations of moulding compositions, ingredients were compounded in ratios as indicated in Table 1. The moulding compositions were prepared by melt-blending the TPE-E's with the flame retardant components and stabilizer package on a ZSK 30/33 twin-screw extruder with screw speed 200 rpm, throughput 10 kg/hr, and melt temperature regulated at 250° C., extruding the melt from the extruder through a die, and cooling and granulating the melt. The granules obtained by compounding in the extruder were dried for 24 hours at 120° C., prior to further use.

Moulding of Test Samples And Insulated Cables

Test samples for testing the mechanical properties and the flame retardancy properties according to UL-94-V were prepared on an injection-moulding machine of type Engel 80 A. For the injection moulding set temperatures of 235-245° C. were used. The mould temperature was 90° C. Cycle times for the test specimens were about 50 sec.

Insulated cables for testing the flame retardancy properties according to UL 1581 VW-1 and the hydrolysis resistance were prepared on an industrial production line. The cables thus produced were bipolar cables, consisting of two copper wires as the conductive cores and a single insulating layer consisting of one of the experimental compositions described below. The bipolar cables were oval shaped while having an oval shaped cross-section with a dimension of 1.4×2.8 mm.

Test Methods

Mechanical properties: Tensile tests were performed according to ISO 527/1A using dry-as-moulded samples. Dimensions of tensile test specimens: thickness 4 mm Flame retardancy: Sample preparation and testing was performed according to UL-94-V and UL 1581 VW-1, respectively.

Hydrolysis resistance: for this test the sample cable is kept in a temperature cycling chamber for 96 hours at 85° C. and 95% rel. humidity. After this conditioning, the cables are subjected to electrical tests to establish its insulation resistance, checking capacitances across conductors. To pass the test the insulation resistance and capacitances across conductors shall not change by more than 5%.

Compounds with the compositions of Examples I-II (EX-I and EX-II) according to the invention and Comparative Experiments A-D (CE-A, CE-B, CE-C and CE-D) were prepared and tested as described above. The compositions and test results are presented in Table 1.

TABLE 1

Compositions (in parts by weight) and test results for Examples I-II and Comparative Experiments A-D

| | CE-A | CE-B | CE-D | CE-D | EX-I | EX-II |
|---|---|---|---|---|---|---|
| TPE-E-1 | 100 | 90 | 70 | | 84.25 | 68.5 |
| TPE-E-2 | | | | 75 | | |
| Mecy | | 10 | 30 | 25 | | |
| B | | | | | 10 | 20 |
| C | | | | | 5 | 10 |
| D | | | | | 0.75 | 1.5 |
| Adds | 0.5 | 0.5 | 0.5 | 0.5 | 0.5 | 0.5 |
| Modulus [MPa] | 50 | 85 | 175 | | 80 | 125 |
| UL-94-V-rating | Fail | 100% V2 | 60% V0 40% V2 | 100% V0 | Fail | 50% V0 50% V2 |
| UL 1581 VW-1 | Fail | Fail | Fail | Fail | Pass | Pass |
| Hydrolytical requirements | | | | | Pass | Pass |

Examples I and II concerning flame retardant polyether ester elastomer compositions and insulated wires made thereof according to the invention pass the flame retardancy test according to the UL 1581 VW-1 standard, despite the moderate or even negative test results in the flame retardancy test according to the UL-94-V standard and slow only a moderate increment in the modulus of the polyether ester elastomer. In contrast, the Comparative Experiments B-D concerning polyether ester elastomer comprising melamine cyanurate as flame retardant and insulated wires made thereof all fail in the flame retardancy test according to the UL 1581 VW-1 standard, despite the fact that some of these compositions score better in the flame retardancy test according to the UL-94-V standard or even obtain a full 100% V0 rating. Furthermore, these compositions show an increment in the modulus of the polyether ester elastomer which is significantly larger than compositions according to the invention with a similar amount of flame retardant.

The invention claimed is:

1. An insulated wire for use in electronic equipment, consisting of an electrically conductive core and an insulating layer and/or an insulating jacket surrounding the electrically conductive core to impart to the insulated wire a vertical flame retardancy which complies with UL Standard UL1581 VW-1, wherein the insulating layer and/or the insulating jacket consist of a flame retardant thermoplastic composition surrounding the electrically conductive core, and wherein the flame retardant thermoplastic composition consists of:

(A) a thermoplastic polymer comprising a copolyester elastomer, (B) a metal salt of a phosphinic acid of the formula $[R^1R^2P(O)O]_m M^{m+}$ (formula I) and/or a diphosphinic acid of the formula $[O(O)PR^1-R^3-PR^2(O)O]^{2-}_n M^{m+}_x$ (formula II), and /or a polymer thereof, wherein $R^1$ and $R^2$ are equal or different substituents chosen from the group consisting of hydrogen, linear, branched and cyclic C1-C6 aliphatic groups, and aromatic groups, $R^3$ is chosen from the group consisting of linear, branched and cyclic C1-C10 aliphatic groups and C6-C10 aromatic and aliphatic-aromatic groups, M is a metal chosen from the group consisting of Mg, Ca, Al, Sb, Sn, Ge, Ti, Zn, Fe, Zr, Ce, Bi, Sr, Mn, Li, Na, and K, and m, n and x are equal or different integers in the range of 1-4, (C) a flame retardant component consisting of a nitrogen containing flame retardant synergist and/or a phosphor/nitrogen containing flame retardant, and (D) an inorganic compound chosen from the group consisting of basic and amphoteric oxides, hydroxides, carbonates, silicates, borates, stannates, mixed oxide-hydroxides, oxide-hydroxide-carbonates, hydroxide-silicates and hydroxide-borates, and mixtures thereof.

2. The insulated wire according to claim 1, wherein the copolyester elastomer of the thermoplastic polymer (A) is a copolyetherester elastomer.

3. The insulated wire according to claim 1, wherein the copolyester elastomer is present in a total amount of at least 50 wt. %, relative to the total weight of the thermoplastic polymer (A).

4. The insulated wire according to claim 1, wherein the metal salt (B) is a salt of a metal chosen from the group consisting Ca, Al, Zn, and combinations thereof.

5. The insulated wire according to claim 1, wherein the $R^1$ and $R^2$ are equal or different and are $H_1$ methyl and/or ethyl.

6. The insulated wire according to claim 1, wherein the metal salt (B) is a hypophosphate and/or a C1-C2 dialkylphosphinate.

7. The insulated wire according to claim 1, wherein the flame retardant component (C) is a phosphate compound.

8. The insulated wire according to claim 1, wherein the inorganic compound (D) is zinc borate.

9. The insulated wire according to claim 1, wherein the metal salt (B), the flame retardant component (C) and the inorganic compound (D) are present in the thermoplastic composition in a total amount of 10-50 wt. %, relative to the total weight of the thermoplastic composition.

10. The insulated wire according to claim 1, wherein the metal salt (B) and the flame retardant component (C) are present in a weight ratio in the range of 9:1-2:9.

11. The insulated wire according to claim 1, wherein the compound (C) is present in an amount of 0.01-5 wt. %, relative to the total weight of the thermoplastic composition.

12. The insulated wire according to claim 1, wherein
the copolyetherester elastomer is present in an amount of at least 50 wt. %, relative to the total weight of the thermoplastic polymer (A);
the metal salt (B), the flame retardant component (C) and the inorganic compound (D) are present in a total amount of 10-50 wt. %, relative to the total weight of the thermoplastic composition;
the metal salt (B) is Ca-hypophosphite and/or an Al—$C_i$—$C_2$ dialkylphosphinate;
the flame retardant component (C) is melamine phosphate compound; wherein the metal salt and the melamine phosphate compound are present in a total amount of at least 50 wt. %, relative to the total weight of (B) and (C); and
the inorganic compound (D) is zinc borate in an amount of 0.01-5 wt. %, relative to the total weight of the thermoplastic composition.

13. A connection cable comprising (i) a piece of an insulated wire according to claim 1 and (ii) one or two connection elements, for connecting the cable to electrical and/or electronic equipment and/or to a power supply unit, fixed to the piece of insulated wire.

14. Electronic equipment comprising an insulated wire according to claim 1.

* * * * *